Sept. 8, 1931.                O. ONSRUD                1,822,501
FLUID ACTUATED GRIPPING AND WORK POSITIONING MEANS
Filed Nov. 22, 1930    2 Sheets-Sheet 1
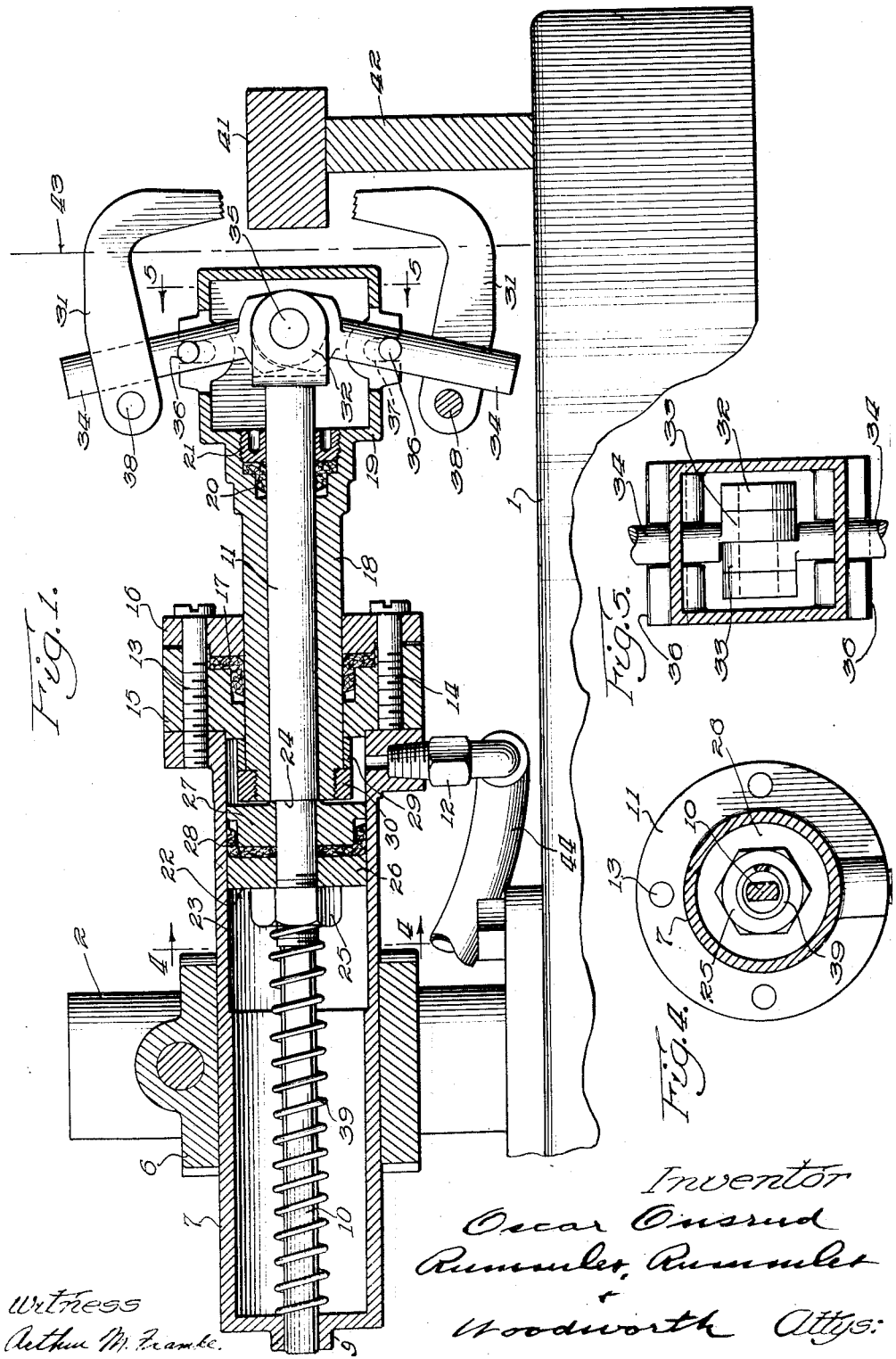

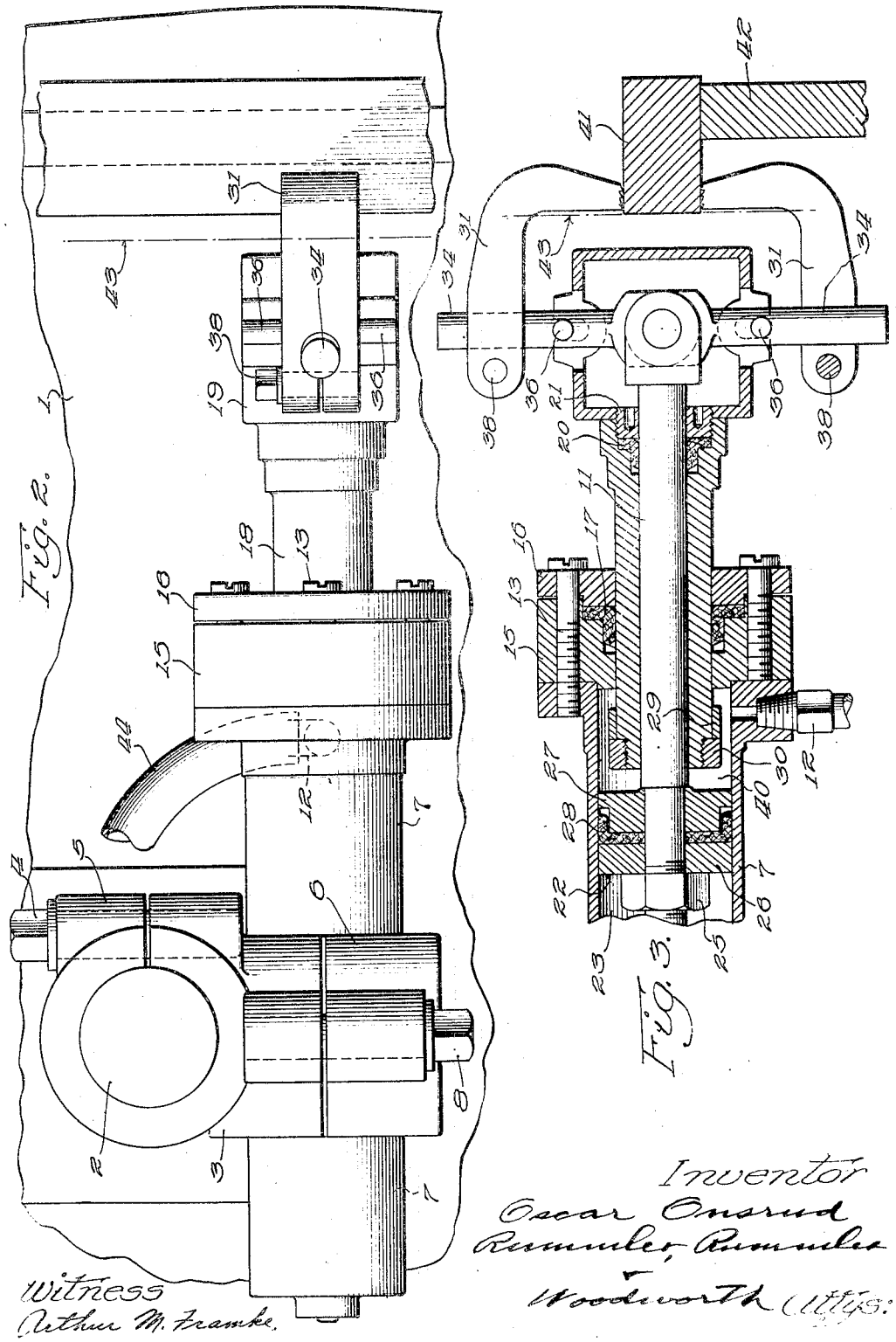

Patented Sept. 8, 1931

1,822,501

UNITED STATES PATENT OFFICE

OSCAR ONSRUD, OF CHICAGO, ILLINOIS, ASSIGNOR TO ONSRUD MACHINE WORKS, INC., OF CHICAGO, ILLINOIS, A CORPORATION OF ILLINOIS

FLUID ACTUATED GRIPPING AND WORK-POSITIONING MEANS

Application filed November 22, 1930. Serial No. 497,470.

This invention relates to fluid-actuated mechanism useful for various purposes and herein shown as particularly designed for correcting the position of work where the articles to be operated upon are roughly placed in a position to be engaged by cutting tools; for example, in machines of the character shown in the patent to Oscar Onsrud No. 1,685,613, wood working machine, dated September 25, 1928.

Work placed upon a rotating table in the said patented machine is automatically clamped thereon and firmly held during the cutting operations. Such a machine is frequently employed for shaping irregularly formed articles which may be roughly fashioned before being placed upon the table of the shaping machine, it being necessary for the operator to accurately gauge the work against stops or supports on the machine.

In order to automatically take care of the accurate positioning of the work when placed upon the work support and to save the time of the operator, the present adjusting or positioning device is provided.

An object of the invention is to provide pneumatic means for gripping articles to be worked upon and drawing them against stops into position where they will be correctly engaged at the intended points by working tools. Further objects of the invention are to provide an improved fluid-actuated piston construction for successively performing different actions and to provide an improved gripping head adapted to carry and operate gripping devices which may vary in design to suit particular purposes.

The objects of the invention are accomplished by a construction as illustrated in the drawings, wherein:—

Figure 1 is a longitudinal sectional view of a pneumatically operated grip and work adjusting means.

Fig. 2 is a plan view of the construction shown in Figure 1.

Fig. 3 is a fragmentary longitudinal section showing the gripping head and operating piston in moved position from that shown in Figure 1 and as it would appear when it has drawn the article or work against fixed stops and into the position to be operated upon by cutting tools.

Fig. 4 is a sectional detail taken on the line 4—4 of Fig. 1.

Fig. 5 is a detail sectional view of part of the gripping head and taken on the line 5—5 of Figure 1.

The principal characteristics of the construction illustrated are a cylinder in which is reciprocable a piston of a double nature wherein one portion thereof first moves to obtain a desired action and then the entire piston moves as a unit to effect another action.

The piston structure carries a gripping head operable upon the first action of the piston to grip an article to be operated upon and on the second action of the piston to draw this article against gauging means or fixed stops.

Referring to the drawings, a machine table 1 is shown supporting a post 2, which carries, for vertical and angular adjustment thereon, a bracket 3 clamped to the post by a screw 4 passing through a split collar 5 forming part of the bracket. The bracket also has integral therewith a split collar 6 for supporting the pneumatic gripping means by encircling a cylinder 7 thereof and to which the collar 6 is clamped by means of screw 8. Before the screw is tightened, the gripping means may be adjusted longitudinally and angularly within the collar 6 to suit the character of the article to be operated upon and the location of the stops against which the work is to be drawn by the work adjusting means.

The cylinder 7 at its ends is provided with means for guiding the piston structure as it reciprocates within the cylinder. For this purpose, it is provided at one end with a bearing 9 through which passes a reduced end 10 of a rod 11 forming part of the piston structure. At its opposite end the cylinder is flanged outwardly to provide metal which may be tapped to receive a fitting 12 for compressed air and screws 13 and 14 by means of which piston bearing members 15 and 16 are secured to the flange.

A packing 17 is held between the bearing members 15 and 16 and surrounds a part 18 of the piston which is guided in the bearing members 15 and 16. The part 18 of the piston carries or is integral with the gripping head 19.

The rod 11 and piston element 22 secured thereto reciprocate with the part 18 of the piston and also independently thereof. To prevent leakage of air from the cylinder 7 between the relatively movable members of the piston, a packing 20 is placed between the rod 11 and part 18, and is held in such position by an externally threaded nut 21 engaging threads cut into part 18.

The part 22 of the piston which fits the enlarged bore 23 of cylinder 7 is clamped upon the rod 11 between a shoulder 24 thereon and a nut 25 having threaded engagement with the rod. The part 22 of the piston consists of two end members 26 and 27 and a packing 28 therebetween.

The limit of outward movement of the part 18 of the piston with reference to the cylinder 7 is determined by a ring-shaped spacer 29 surrounding the inner end of the part 18 and abutting the member 15 and is retained upon the piston plunger 18 by nut 30.

For the purpose of actuating gripping fingers 31, the rod 11 is forked at its outer end, as indicated at 32, to receive the flattened ends 33 of gripping finger supporting levers 34. These levers are pivotally secured to the forked end of piston rod 11 by a pin 35. The pivots for the levers 34 are provided for by pins 36 passing through the levers and resting in slots 37 formed in the head 19. The gripping fingers 31 are clamped to the levers 34 by screws 38, passing through the split securing end of the fingers. This arrangement provides for the adjustment of the fingers 31 on the levers 34.

Before an actuation of the work gripping and positioning mechanism, the piston structure is held to the right, as viewed in Fig. 1, with the gripping fingers or jaws 31 in wide open position, by means of a spring 39 encircling the reduced portion 10 of piston rod 11. The piston rod and the gripping means connected therewith cannot rotate upon its axis, due to the form of bearing 9 and the cross-section of part 10 of the rod as shown in Fig. 4.

When air under pressure is admitted to the cylinder through the fitting 12, it enters the cylinder at the space 40 to the right of piston 22 as shown in the drawings, and between this part of the piston construction and the part 18 thereof, and the inner exposed area of the fixed end member 15 of the cylinder. Since the ring 29 of part 18 of the piston structure bears against this end member, the part 18 cannot move further to the right, and the result of the air pressure is to first move the piston 22 to the left, Fig. 1, against the action of spring 39. Since the rod 11 is rigid with the piston 22, it also moves to the left, thus rocking the levers 34 around their pivots 36, and engaging the jaws or fingers 31 with an article or work element indicated by numeral 41, which has been placed upon the rest 42. The article of work 41 therefore determines the limit of inward motion of the gripping fingers 31, and further relative movement between the piston rod 11 and the part 18 of the piston structure is therefore prevented.

The piston elements 22 and 18, and the rod 11, then move to the left, as a unit, until stopped by the work 41 engaging limit stops indicated by the dot and dash line 43 in the drawings. This latter action is due to the combined area of the right hand exposed surface of piston 22 and the right hand end of ring 29 exceeding the opposed surface area of nut 30 and the end of sleeve 18. After the work has thus been drawn up to the stops 43, it may be clamped in this position by other means and the gripping fingers 31 are released therefrom and the piston structure is allowed to return to the position indicated by Figure 1, under the action of spring 39, by permitting the air to exhaust from space 40. This is preferably accomplished by means of a two-way valve structure in the air supply conduit 44, but not shown.

Although but one specific embodiment of this invention is herein disclosed, modifications thereof may be made without departing from the claims.

I claim:

1. A fluid pressure operated device, comprising a cylinder, a piston construction including a pair of piston elements each slidably mounted within said cylinder, means for admitting fluid under pressure to said cylinder and between said pair of elements, one of said piston elements having greater area exposed to the fluid pressure than the other piston element, and a connection between said piston elements whereby the one with greater exposed area may during a portion of its stroke move the other piston element.

2. A fluid pressure operated gripping means, comprising a cylinder, a piston construction including two piston elements mounted for reciprocation relatively to each other and together within said cylinder means for admitting fluid under pressure to said cylinder and between said piston elements, a gripping device comprising jaws supported by one of said piston elements for movement toward and away from each other, and a connection between the other piston element and said jaws for effecting such movement.

3. A fluid pressure device, comprising a cylinder, a piston construction including a pair of piston elements each slidably mounted within said cylinder, means for admitting fluid under pressure to said cylinder, one of said piston elements having a greater area exposed to the fluid pressure than the other piston element for the purpose of causing one piston element to move in advance of the other, a gripping device, and connections between said gripping device and each of said piston elements whereby each piston element effects a different motion of said gripping device.

4. A fluid pressure device, comprising a cylinder, a pair of piston elements each slidable within said cylinder and arranged to move different lengths of strokes, means for admitting fluid under pressure to said cylinder, an actuated device having a separate connection to each of said piston elements whereby the actuated device receives the compound motion of said piston elements.

5. A fluid pressure operated gripping and work positioning means comprising a gripping head including jaws movably mounted thereon, fluid actuated means for moving said jaws on said head and for moving said jaws and head as a unit comprising a pair of piston elements, one of said piston elements having an operative connection with said jaws and the other of said piston elements being arranged to carry said head, a cylinder within which said piston elements are fitted, and one of said piston elements being slidably mounted within the other.

6. A fluid pressure operated gripping and work positioning means comprising a cylinder, a hollow piston element projecting from said cylinder, jaws pivoted to the outer end of said piston element, a second piston element slidably mounted within the first mentioned piston element and having an operative connection with said jaws, and means for admitting fluid under pressure to said cylinder.

Signed at Chicago this 19th day of November, 1930.

OSCAR ONSRUD.